| United States Patent [19] | [11] Patent Number: 6,006,896 |
| Foster | [45] Date of Patent: Dec. 28, 1999 |

[54] RECIPROCATING SLAT CONVEYOR WITH FRONT END DRIVE ASSEMBLY

[76] Inventor: Raymond Keith Foster, P.O. Box 1, Madras, Oreg. 97741

[21] Appl. No.: 09/328,029

[22] Filed: Jun. 8, 1999

[51] Int. Cl.⁶ .................................................. B65G 25/04
[52] U.S. Cl. .................................... 198/750.5; 198/750.2; 198/750.6
[58] Field of Search .............................. 198/750.1, 750.2, 198/750.5, 750.6, 750.7

[56] References Cited

U.S. PATENT DOCUMENTS

| 4,184,587 | 1/1980 | Hallstrom | 198/750.2 |
| 5,092,732 | 3/1992 | Foster | 198/750.6 X |

*Primary Examiner*—James R. Bidwell
*Attorney, Agent, or Firm*—Delbert J. Barnard

[57] ABSTRACT

A reciprocating slat conveyor has upper and lower sections formed by upper and lower conveyor slats (14, 12). The upper section is at the forward end of a receptacle (10) in which the conveyor is located. It includes a transition wall (150) that extends the full width of the conveyor. Transition wall (150) is connected to a rear drive beam (28). There are two additional drive beams (24, 26) forwardly of drive beam (28). The upper conveyor slats (14) are connected to the three drive beams (24, 28, 30). The upper conveyor slats (14) are divided into three sets, one for each drive beam (24, 28, 30). The lower conveyor slats (12) are also divided into three sets, one for each drive beam (24, 26, 28) and are connected to the drive beams (24, 26, 28). The upper conveyor slats (14) move with the lower conveyor slats (12) of the same set.

40 Claims, 13 Drawing Sheets

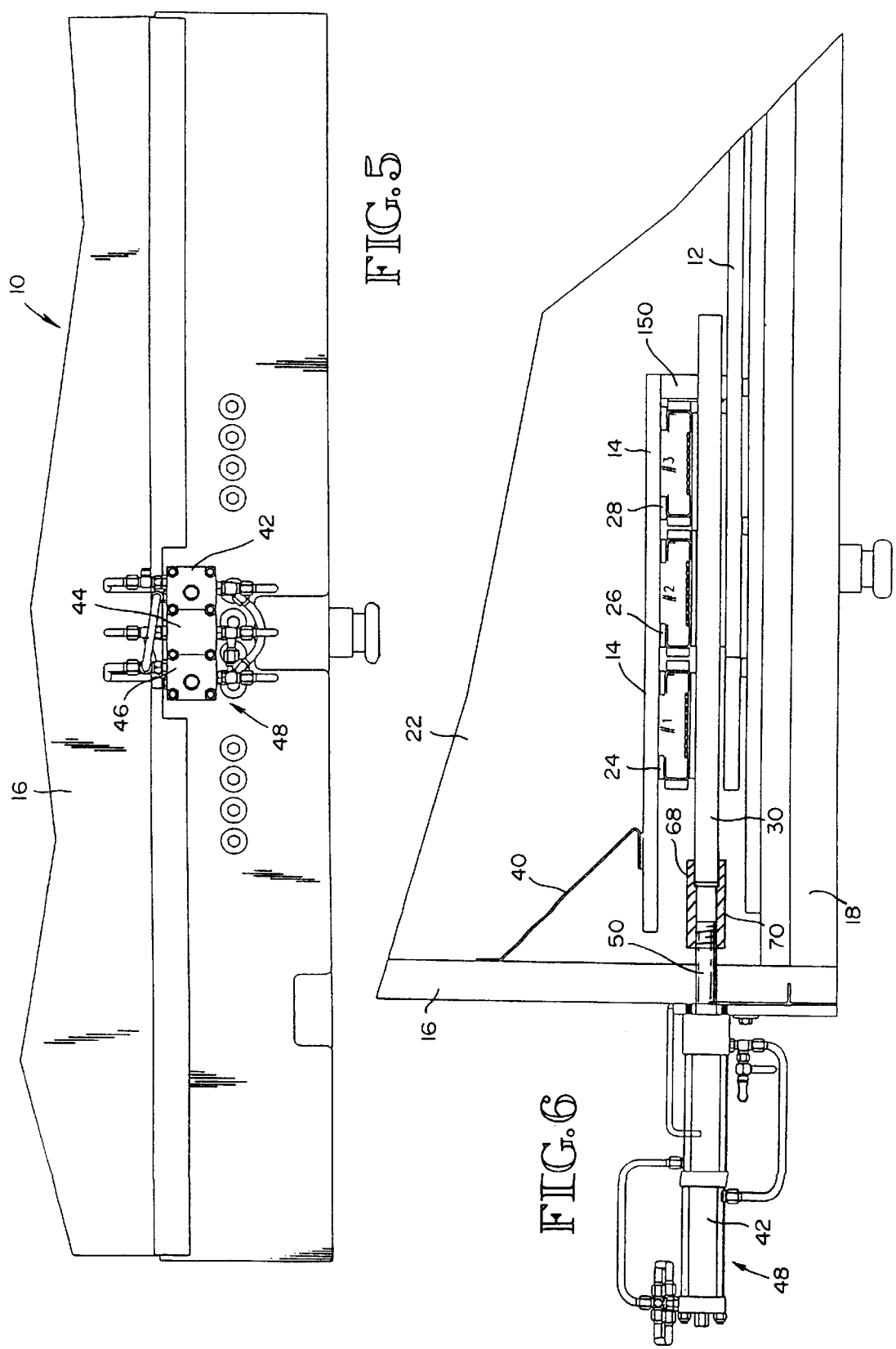

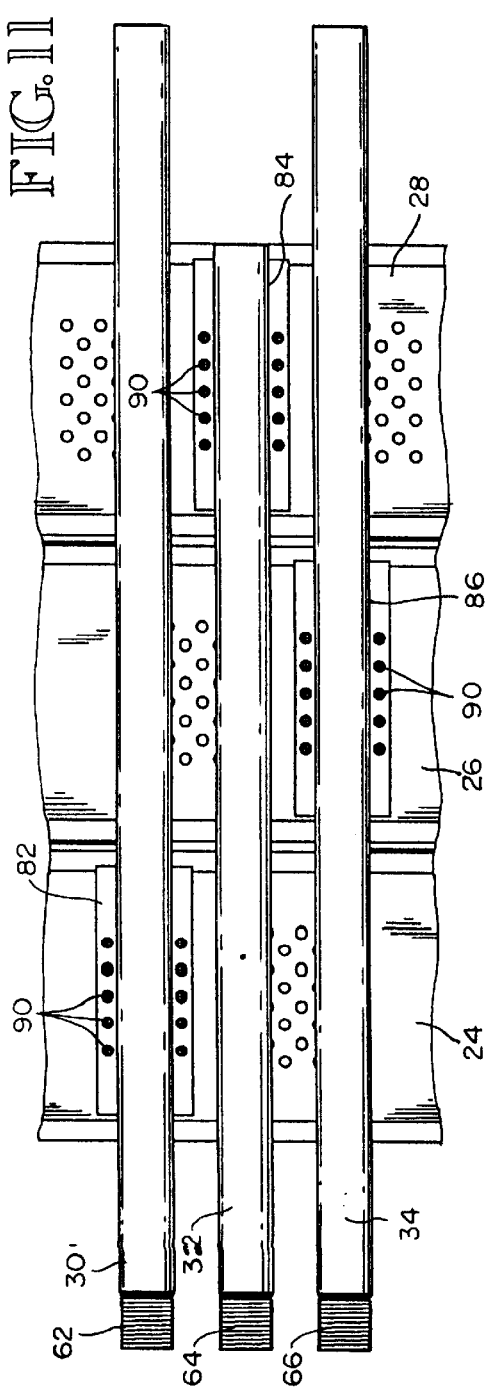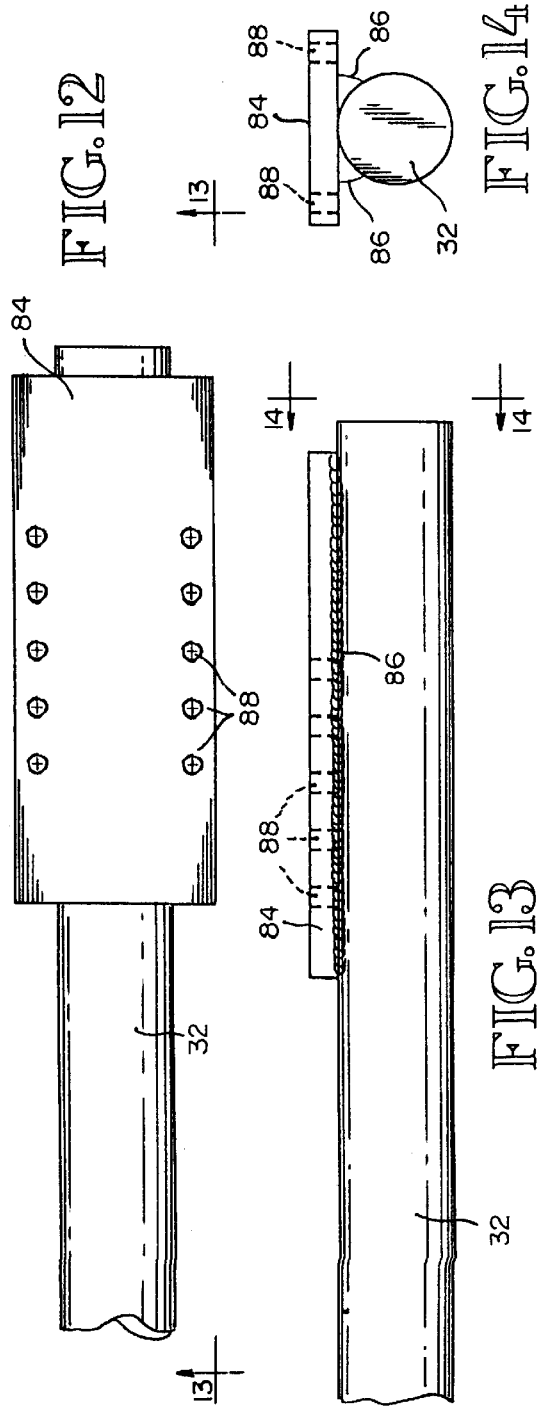

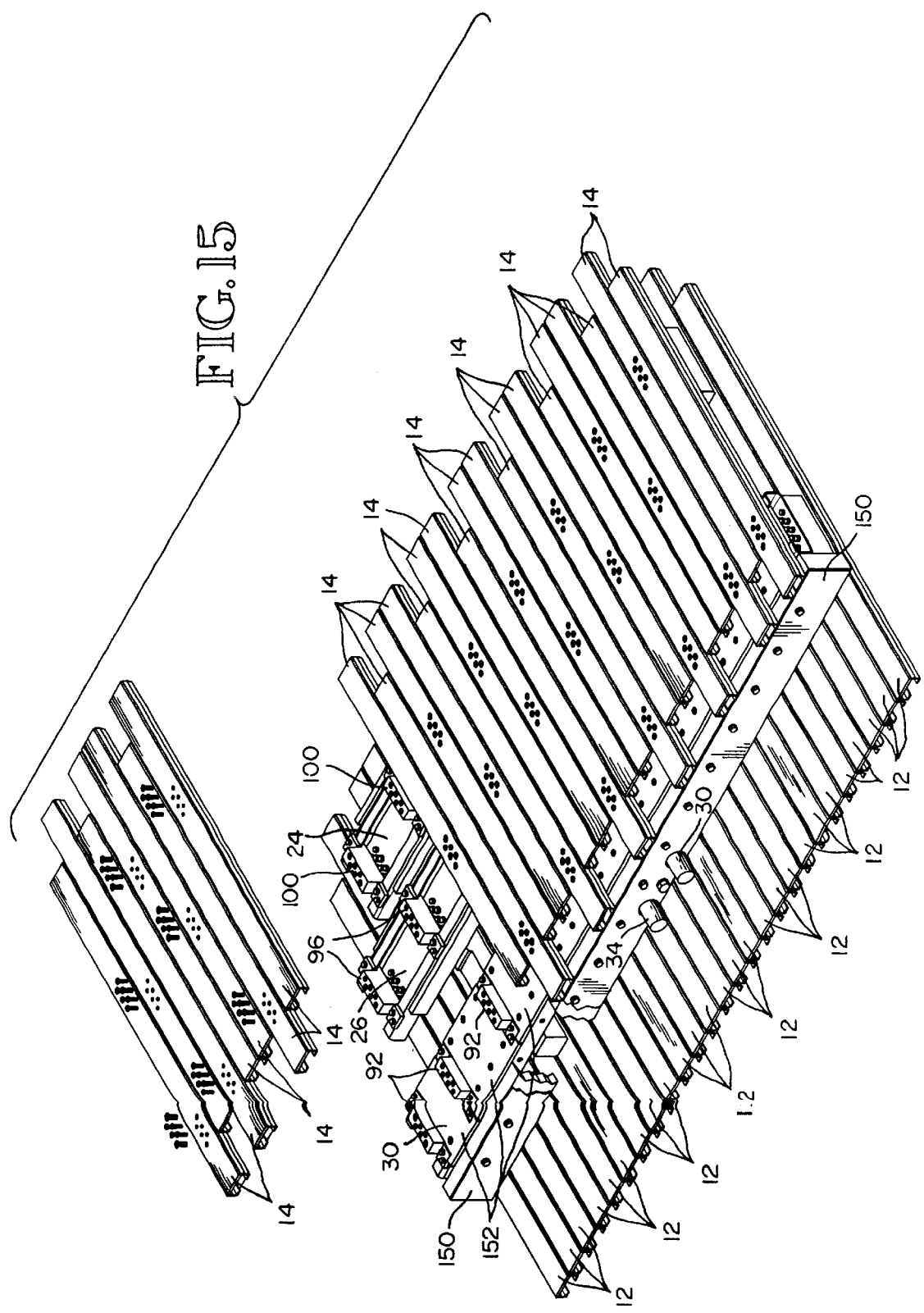

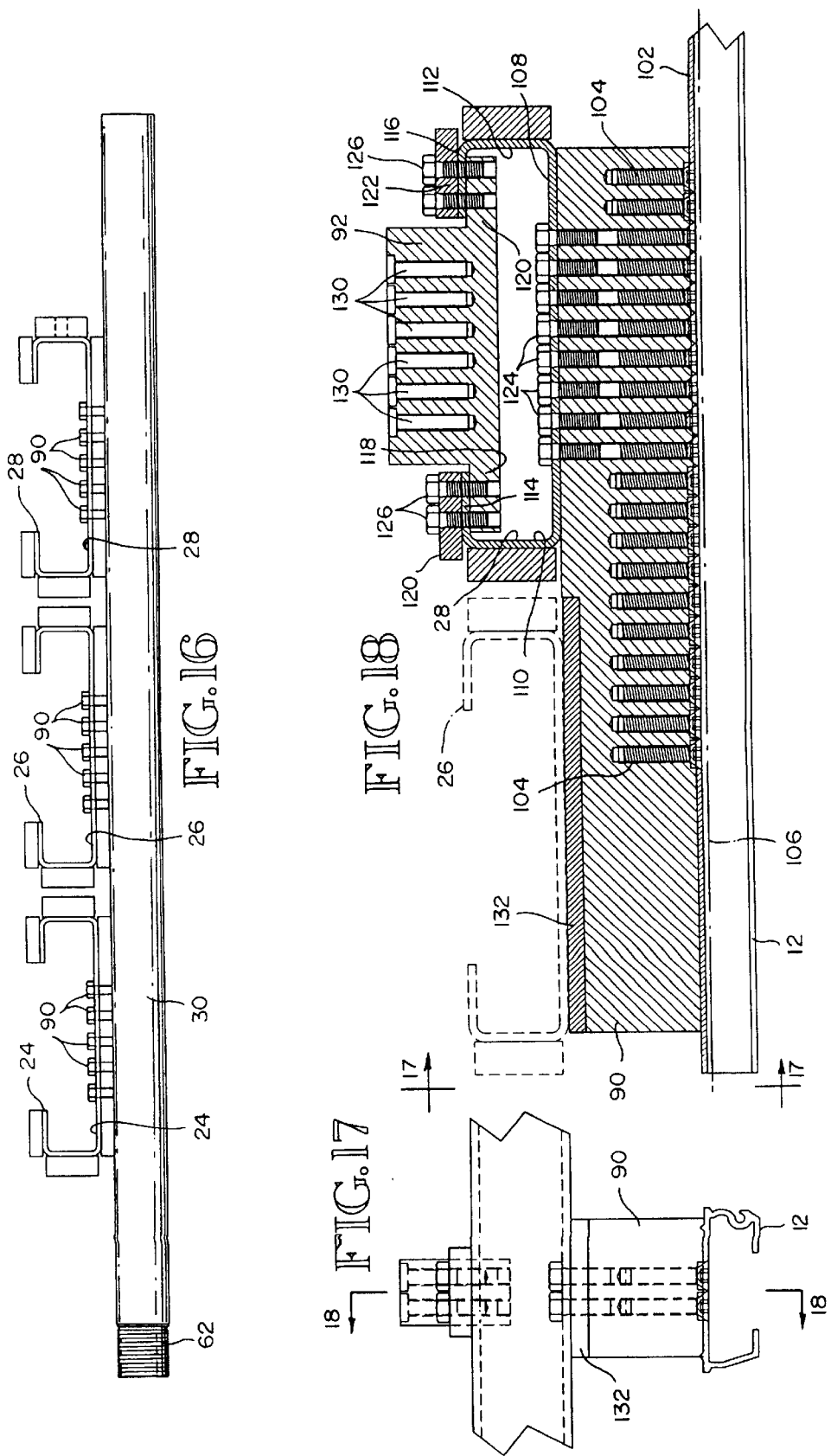

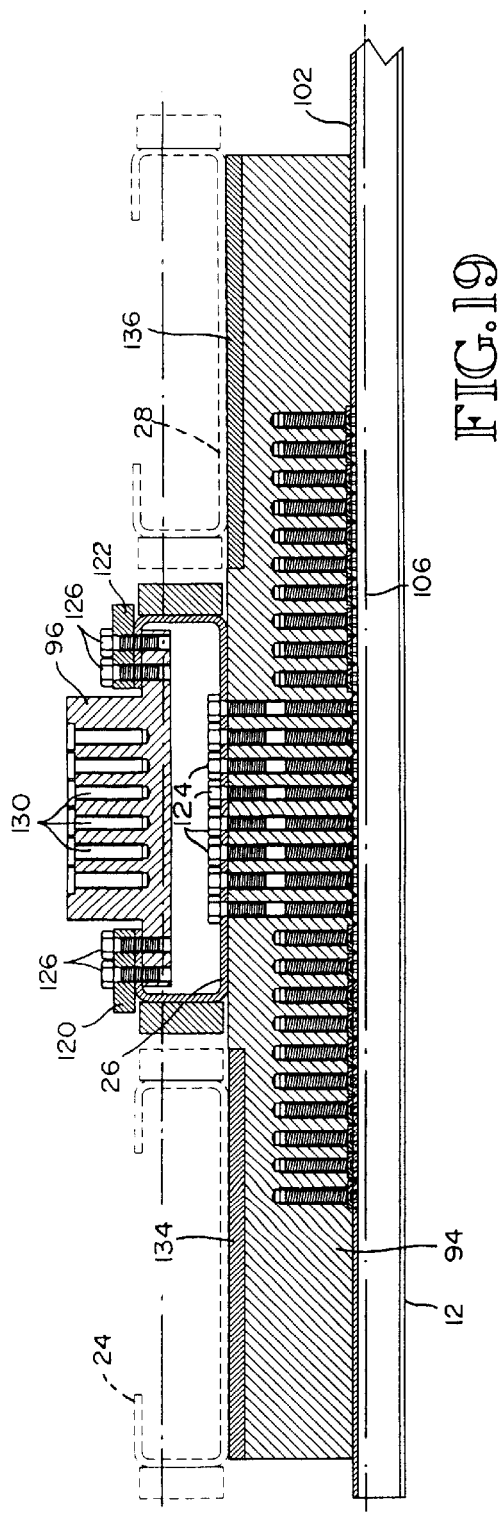
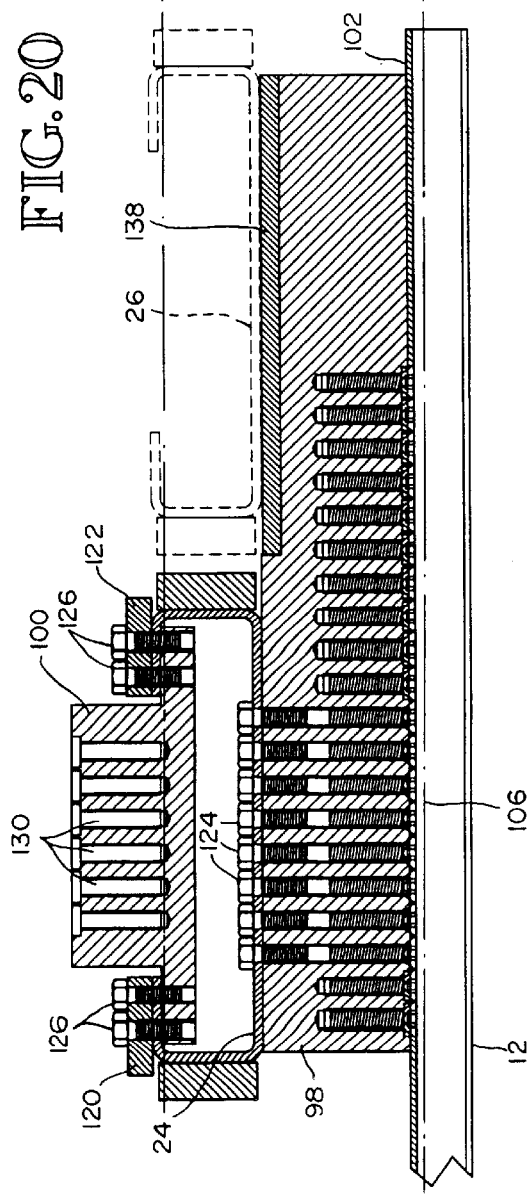

RECIPROCATING SLAT CONVEYOR WITH FRONT END DRIVE ASSEMBLY

TECHNICAL FIELD

This invention relates to reciprocating slat conveyors. More particularly, it relates to a front end drive assembly for reciprocating the conveyor slats that is adapted to take up less compartment space than the prior art front end drive assemblies.

BACKGROUND OF THE INVENTION

Reciprocating slat conveyors comprise a plurality of elongated conveyor slats that are disposed side-by-side and are divided into "sets" and "groups." A tropical conveyor includes three sets "1", "2", "3" and at least eight groups. Each group includes a slat from set "1" next to a slat from set "2" that is next to a slat from set "3". This pattern is repeated from group to group across the width of the conveyor. All of the set "1" slats are connected to a first transverse drive beam. All of the set "2" slats are connected to a second transverse drive beam. All of the set "3" slats are connected to a third transverse drive beam. Each transverse drive beam is connected to a separate hydraulic drive unit. The hydraulic drive units are operated in unison to move the three transverse drive beams and hence all of the slats, in unison, in a first direction, for conveying a load. Then the drive units are operated one at a time in the opposite direction to retract the transverse drive beams one at a time and, hence, retract the conveyor slats one set at a time.

It is common practice to mount the drive units and the transverse drive beams below the conveyor slats. See for example, my U.S. Pat. No. 4,748,863, granted Jun. 7, 1998, and entitled, "Drive/Frame Assembly For A Reciprocating Floor." See also my U.S. Pat. No. 5,350,054, granted Sep. 27, 1994, and entitled, "Ball Block For Mounting Linear Motor." It is also known to mount the drive units at the front end of the conveyor. See for example, my U.S. Pat. No. 5,096,356, granted Mar. 17, 1992, and entitled, "Reciprocating Floor Conveyor In A Receptacle For A Liquid Laden Material." See also U.S. Pat. No. 5,332,081, granted Jul. 26, 1994 to Manfred W. Quaeck, and entitled, "Reciprocating Conveyor Having Detachable Drive Unit."

A characteristic of some of the front mounted drive assemblies is that the transverse drive beams are positioned on top of rather than below the conveyor slats. A problem with existing systems of this type is that the transverse drive beams are housed in a front compartment that is separated from the material compartment by a partitioning bulk head. The bulk head system has the advantage of protecting the drive components from contact by material in the material compartment. At the same time, however, it has the disadvantage of substantially reducing the size of the material receiving compartment.

An object of the present invention is to provide a front end drive assembly for a reciprocating slat conveyor that does not require protection by a bulk head and which extends the conveyor slats forwardly in the material compartment.

BRIEF SUMMARY OF THE INVENTION

Reciprocating slat conveyors of the present invention are characterized by a plurality of longitudinally extending, lower conveyor slats, positioned side-by-side across the conveyor and divided into a plurality of slat sets. A plurality of transverse drive beams, one for each set of lower conveyor slats, are provided at one end of the conveyor. The transverse drive beams extend over and perpendicular to the lower conveyor slats at that end. Each transverse drive beam is connected to its set of lower conveyor slats. Upper conveyor slats, corresponding in number to the lower conveyor slats, extend parallel to the lower conveyor slats above the transverse drive beams. The upper conveyor slats are divided into sets corresponding to the sets of the lower conveyor slats. Each upper set of conveyor slats is connected to the transverse drive beam for the corresponding lower set of conveyor slats. Thus, the upper and lower conveyor slats of each set will move together. According to an aspect of the invention, the upper conveyor slats extend forwardly in the conveyor substantially to a forward end wall. The upper conveyor slats replace the bulk head that characterizes the prior art conveyors that have front end drive assemblies.

The present invention includes providing each transverse drive beam with a plurality of downwardly extending connector blocks, one for each lower conveyor slat of the slat set. Each said connector block is connected to its lower conveyor slat. In the preferred embodiment, each lower conveyor slat comprises a top wall, opposite sidewalls, and bottom flanges, together defining an inner space in the lower conveyor slat. The conveyor further comprises a plurality of longitudinal support beams, one for each lower conveyor slat. Each support beam is situated in the inner space of its conveyor slat. Slat bearings are provided on the support beams below the top walls of the conveyor slats. The top walls of the conveyor slats rests on the slat bearings. The lower conveyor slats are supported by the slat bearings for reciprocating movement lengthwise of the conveyor.

The present invention also includes providing a plurality of upwardly directed connector blocks, one for each upper conveyor slat of its slat set. Each upper conveyor slat is connected to its upper connector block. In the preferred embodiment, each upper conveyor slat comprises a top wall, opposite sidewalls and bottom flanges, together defining an inner space in the upper conveyor slat. Each upwardly directed connector extends into the inner space of its upper conveyor slat and is connected to the top of its upper conveyor slat.

The transverse drive beams may be lipped channels, each comprising a bottom web, a pair of opposite side flanges extending upwardly from said bottom web, and a pair of top lips projecting inwardly from the flanges. The transverse drive beam includes an inner space and a top avenue into the inner space defined by and between the top lips. In preferred form, each transverse drive beam includes a plurality of downwardly extending connector blocks, one for each lower conveyor slat of its slat set. Each connector block has a top connected to the web of its transverse drive beam and a bottom resting on and being connected to its lower conveyor slat. According to an aspect of the invention, the upwardly directed connector blocks are connected to the lips of the transverse drive beam.

The invention further includes providing a conveyor of the type described which has a plurality of drive rods, one for each transverse drive beam. The drive rods extend longitudinally of the conveyor below the transverse drive beams and above the lower conveyor slats. Each drive rod is secured to its transverse drive beam and it extends forwardly from its transverse drive beam in parallelism with the other drive rods, each to a forward end. In preferred construction, each drive rod includes a mounting plate to which the drive rod is connected. Each mounting plate is detachably secured to its transverse drive beam, such as by bolt connectors.

Another aspect of the present invention is to position a conveyor of the type described inside of a receptacle. The transverse drive beams and the upper conveyor slats are adjacent a front wall of the receptacle. The transverse drive beams are positioned below the upper conveyor slats and the material receiving compartment in the receptacle extends forwardly of the transverse drive beams.

Other objects, advantages and features of the invention will become apparent from the description of the best mode set forth below, from the drawings, from the claims and from the principles that are embodied in the specific structures that are illustrated and described.

BRIEF DESCRIPTION OF THE SEVERAL VIEWS OF THE DRAWING

In the drawings, like reference numerals and letters refer to like parts throughout the several views, and:

FIG. 5 is a fragmentary front end view of the receptacle, taken substantially along 5—5 of FIG. 6;

FIG. 6 is a longitudinal sectional view taken substantially along line 6—6 of FIG. 5;

FIG. 11 is an enlarged scale fragmentary view of the drive rods and the structure that connects the drive rods to the transverse drive beams;

FIG. 12 is an enlarged scale plan view of a connector plate that is welded to an associated drive rod;

FIG. 13 is a side elevational view of the connector plate and drive rod assembly, taken substantially from the aspect of line 13—13 of FIG. 12;

FIG. 14 is an end view taken substantially along line 14—14 of FIG. 13;

FIG. 15 is a fragmentary pictorial view taken from above and towards the rear and one side of the upper slat assembly, with some of the upper slats showing spaced above the transverse drive beams and the connector blocks for the upper slat members;

FIG. 16 is a sectional view taken substantially along line 16—16 of FIG. 10;

FIG. 17 is an end view taken substantially along line 17—17 of FIG. 18;

FIG. 18 is a longitudinal sectional view taken substantially along line 18—18 of FIG. 17;

FIG. 19 is a longitudinal sectional view taken substantially along line 19—19 of FIG. 15; and FIG. 20 is a longitudinal sectional view taken substantially along line 20—20 of FIG. 15.

DETAILED DESCRIPTION OF THE INVENTION

Figure 1:
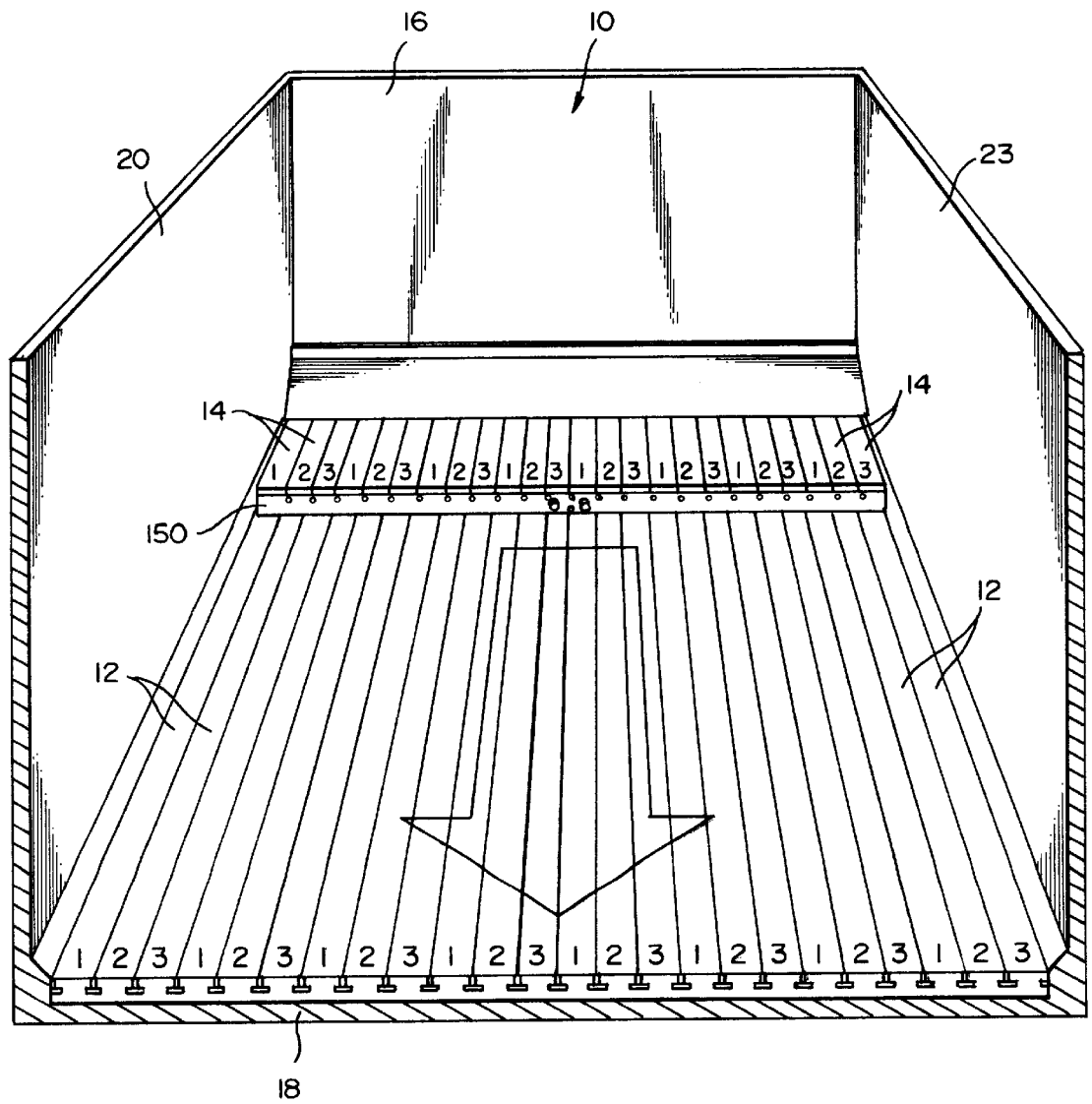
FIG. 1 is a pictorial view taken from above and looking towards the rear end and top of a conveyor of the present invention, shown within a material receiving receptacle, such view showing all of the conveyor slats moving rearwardly in unison towards the rear end opening in the receptacle.

FIGS. 1–4 show a reciprocating slat conveyor that exemplifies the present invention. It is shown within a receptacle 10 that may be a trailer box, a truck box or a stationary installation, for example. The conveyor comprises lower conveyor slats, some of which are designated 12. Slats 12 extend substantially the full length of the receptacle 10. The conveyor also includes upper conveyor slats, some of which are designated 14. Slats 14 are much shorter than slats 12. The factors that determine the length of the slats 14 are described below. The lower conveyor slats 12 extend side-by-side and the upper slats 14 extend side-by-side. The tops of the slats 12 are substantially coplanar. The tops of the conveyor slats 14 are substantially coplanar. Slats 14 are elevated above the slats 12.

The slats 14, 12 are also numbered "1", "2" and "3", etc. Each of these numbers is the number of a slat set. In the illustrated example, there are three slat sets, hence, the numbering "1", "2", "3". Starting from the left side of FIG. 1, there is first a set "1" slat, then a set "2" slat and then a set "3" slat. Together these three slats "1", "2", "3" form a slat group. In the embodiment shown by FIGS. 1–4 there are eight groups of slats. In each group, the slat on the left is from set "1." The next slat is from set "2." The last slat of the group is from set "3" and is on the right. The groups repeat this pattern from the left side of the conveyor over to the right side. Each upper slat 14 is in line with and above a related slat 12. Accordingly, each upper set "1" slat moves with a related lower set "1" slat. Each upper set "2" slat moves with a related lower set "2" slat. Each upper set "3" slat moves with a related lower set "3" slat.

Figure 2:
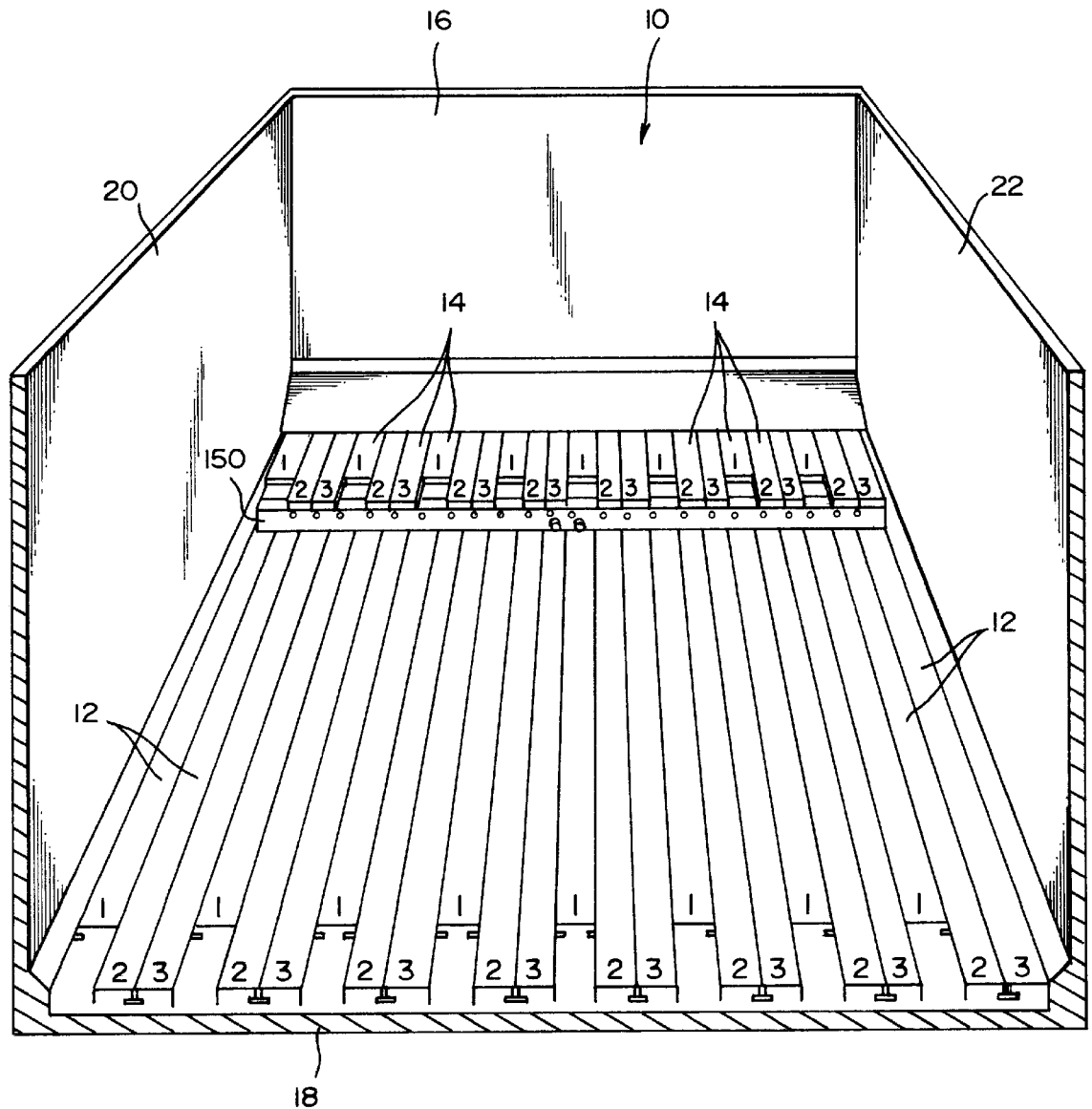
FIG. 2 is a view like FIG. 1, showing a first set of conveyor slats being retracted and the other two sets being stationary.
Figure 3:
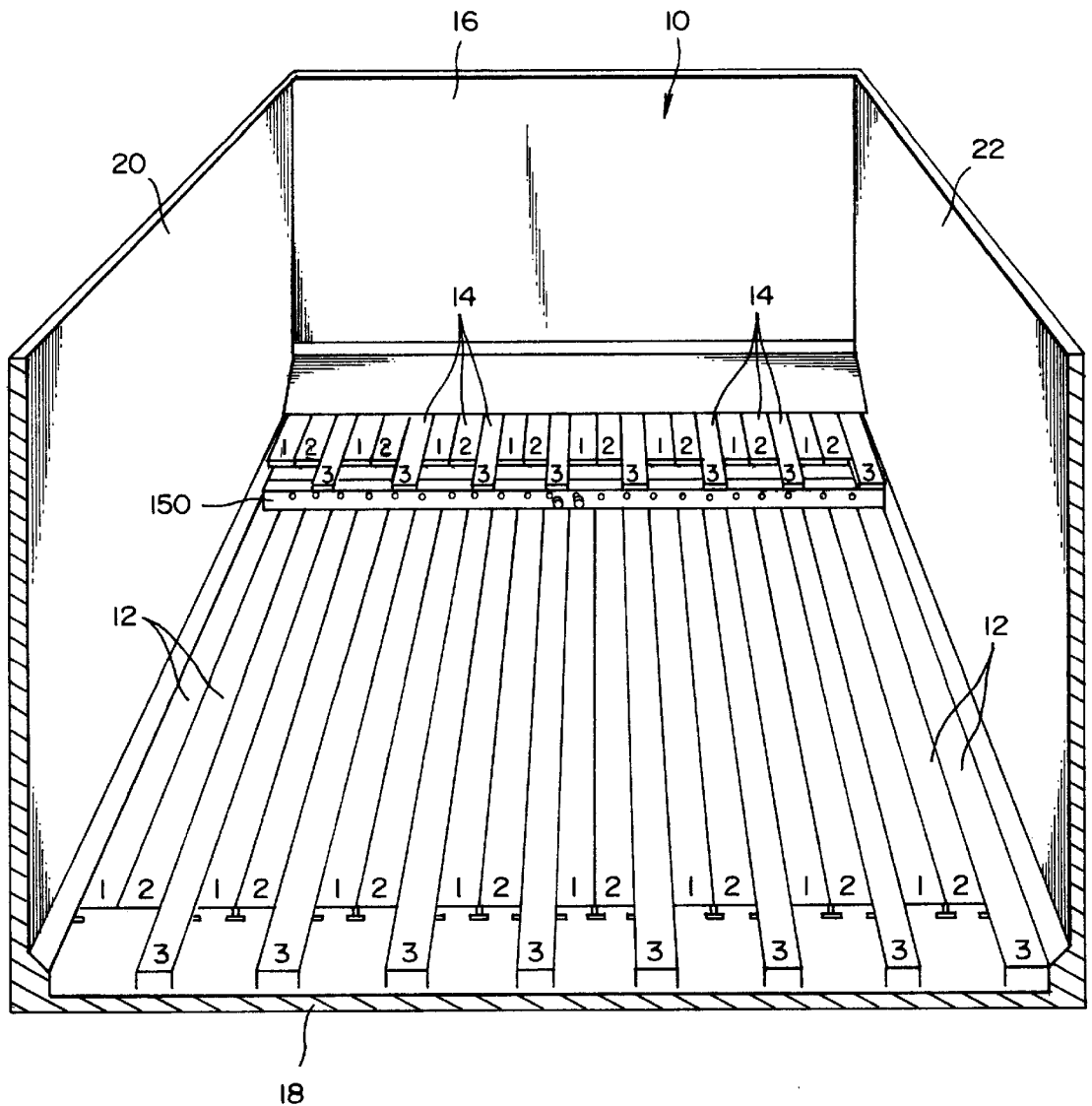
FIG. 3 is a view like FIGS. 1 and 2, but showing the second set of conveyor slats substantially at the end of a retraction stroke and showing the first and third sets of conveyor slats stationary.
Figure 4:
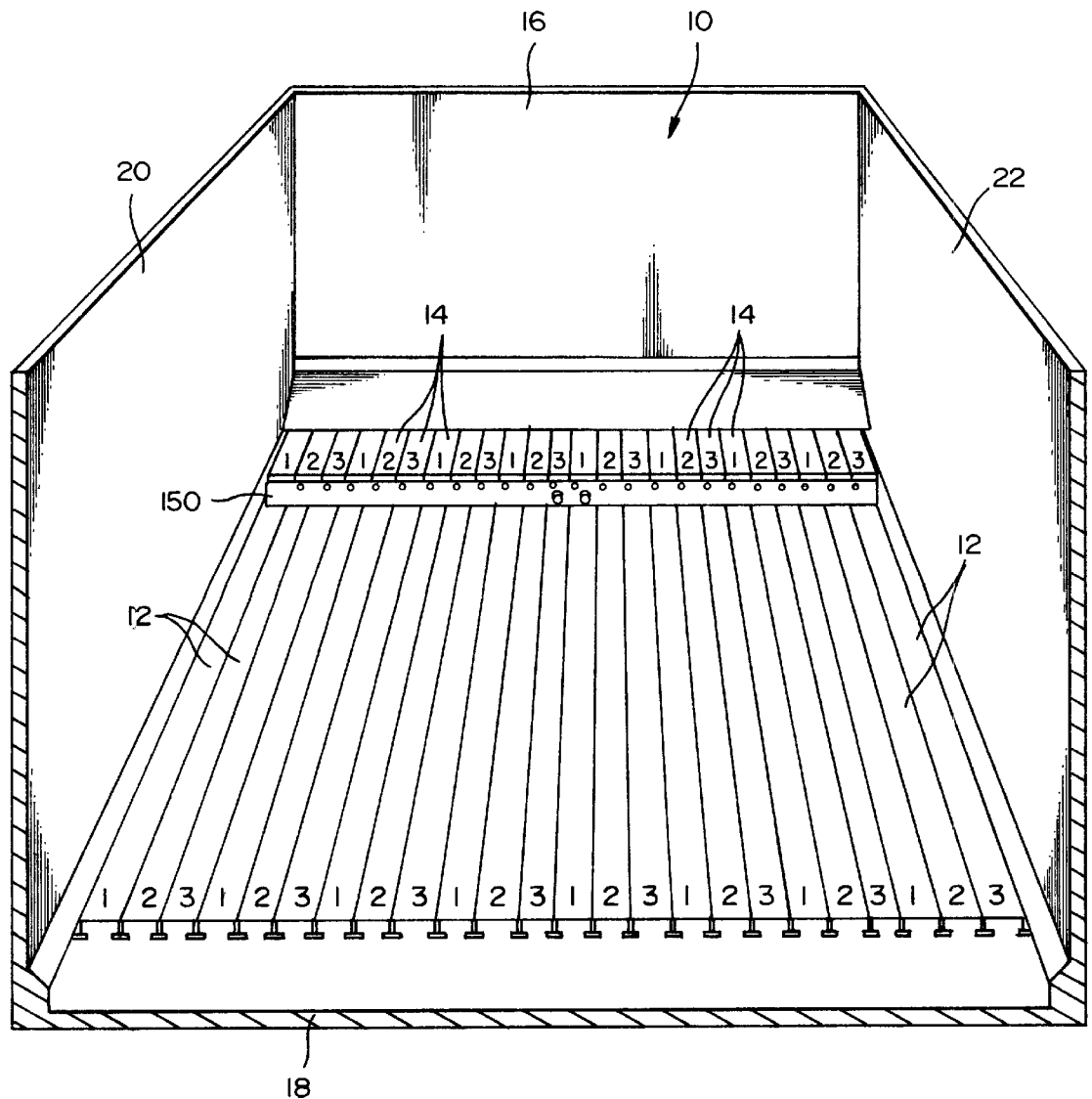
FIG. 4 is a view like FIGS. 1–3, showing all three sets of conveyor slats fully retracted.

FIG. 1 shows all of the conveyor slats 12, 14 moving together and close to reaching fully extended positions. Assuming that there is a load in the receptacle 10, on the conveyor slats 12, 14, this load would move towards the rear of the receptacle 10 during the movement that is depicted by FIG. 1. FIG. 2 shows the set "2" and set "3" slats fully extended and shows the set "1" slats being retracted towards the front of the receptacle 10. FIG. 3 shows the set "1" slats fully retracted, the set "2" slats in a substantially retracted position and the set "3" slats still extended. FIG. 4 shows all three slat sets "1", "2", "3" retracted.

As is known in the art, when all of the conveyor slat sets "1", "2", "3" are being extended, the load is carried by the slats towards the rear of the receptacle 10. When only one of the slat sets is being retracted, and the other two slat sets are stationary, the retracting slat set will move rearwardly under the load. The two stationary slat sets will exert frictional forces on the load that will hold the load against movement as the first set moves. Let it be assumed that the receptacle 10 contains particle ice. When all three slat sets "1", "2", "3" are being extended, the ice will move as a body towards the rear of the receptacle. During retraction of the individual sets "1", "2", "3", the slat sets "1", "2", "3" will individually move below the ice, as previously described. However, when the set "3" slats retract, some of the ice on the upper conveyor will fall onto the lower conveyor slats 12.

Figure 10:
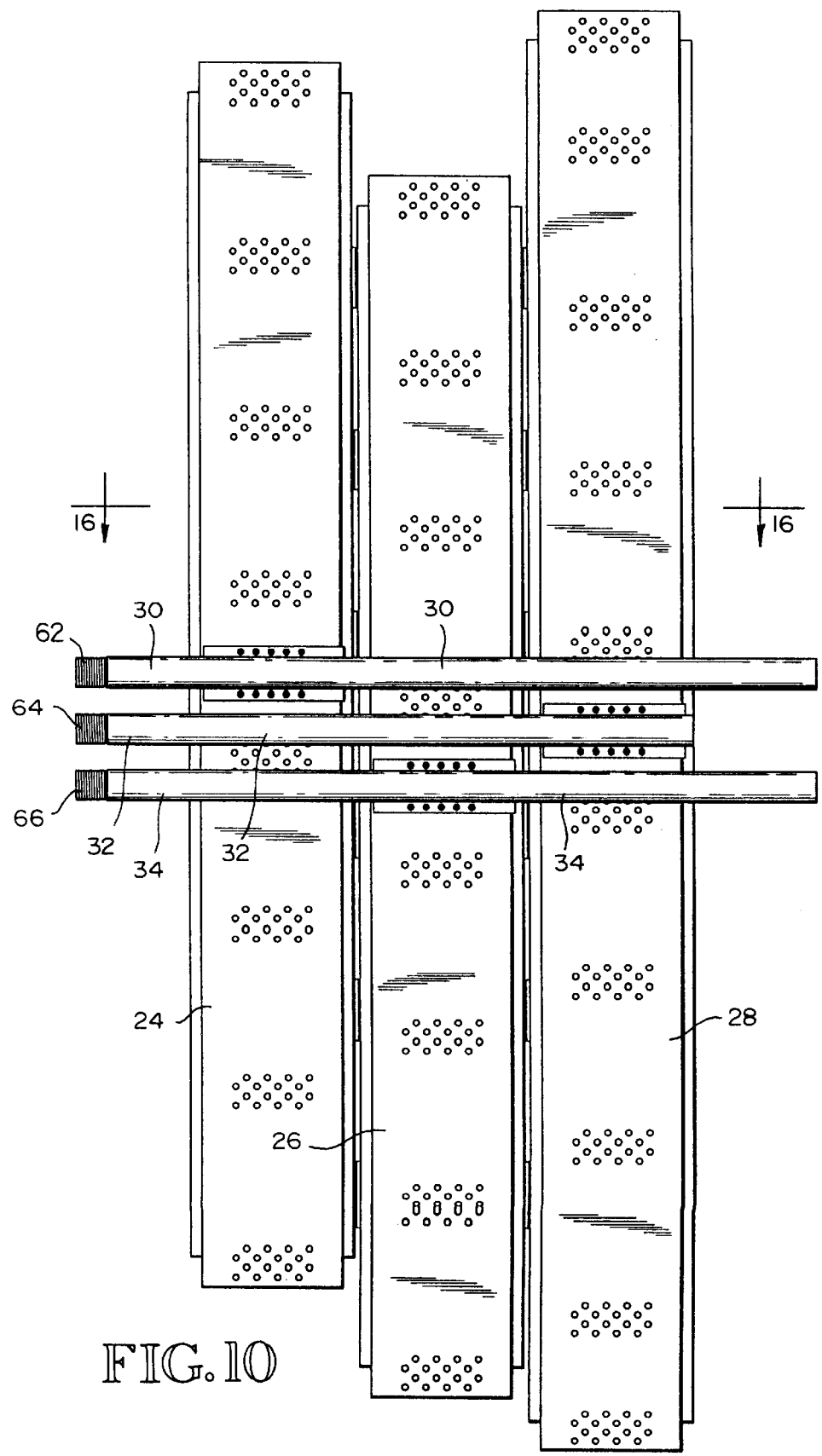
FIG. 10 is a bottom plan view of the drive beam assembly.

Front end wall 16 and opposite sidewalls 20, 22 extend upwardly from a bottom wall 18. The sidewalls 20, 22 are parallel to each other and are perpendicular to front wall 16 and bottom wall 18. Referring to FIG. 6, the lower conveyor slats 12 are connected to three transverse drive beams 24, 26, 28. The set "1" lower slats are connected to beam 24. The set "2" lower slats are connected to the beam 26. The set "3" lower slats are connected to the beam 28. Each transverse drive beam 24, 26, 28 is also connected to a corresponding upper conveyor slat set "1", "2", "3." Thus, both the upper and lower conveyor slat sets "1" are connected to transverse drive beam 24. Both the upper and lower slat sets "2" are connected to the transverse drive beam 26. Both the upper and lower slat sets "3" are connected to the transverse drive beam 28. As best shown by FIGS. 10 and 11, the transverse drive beams 24, 26, 28 are connected to longitudinally extending drive rods 30, 32, 34. Specifically, drive beam 24 is connected to drive rod 30. Drive rod 32 is connected to drive beam 28. Drive rod 34 is connected to drive beam 26. As shown by FIG. 6, a diagonal wall 40 slopes downwardly from front wall 16 to the upper surfaces of the upper conveyor slats 14. The upper conveyor slats 14 reciprocate lengthwise of the conveyor below the rear end section of the wall 80. At most times, all three transverse drive beams 24, 26, 28 are positioned rearwardly of the rear end of sloping wall 40. At times, the forward transverse drive beam 24 will move into a position partially below the sloping wall 40.

The lower conveyor slats 12 are supported for movement by longitudinal beams 36 and plastic bearings 38 that are secured to the beams 36. By way of typical and therefore non limitive example, the support beams may be one inch by one inch metal tubes and the bearings may be bearings that snap onto the metal tubes, such as shown in my U.S. Pat. No. 4,785,929, granted Nov. 22, 1998, and entitled, "Bearing System For Reciprocating Floor Conveyor." Seal strips are preferably positioned between the conveyor slats. These seal strips may be like the seal strips disclosed in my U.S. Pat. No. 5,303,816, granted Apr. 19, 1994 and entitled, "Seal Strip For Reciprocating Floor Conveyors."

As shown by FIGS. 5–8, the transverse drive beams 24, 26, 28 may be driven back and forth lengthwise of the conveyor by drive units 42, 44, 46. Drive units 42, 44, 46 may be bundled together to form a drive assembly or module 48. Drive unit 42 includes a piston rod 50. Drive unit 44 includes a piston rod 52. Drive unit 46 includes a piston rod 54. The rear end portions of the piston rods 50, 52, 54 may be provided with threads or concentric rings 56, 58, 60. The drive rods 30, 32, 34 may include complementary end sections 62, 64, 66. Upper and lower coupler blocks 68, 70 and 72, 74, and 76, 78 may be used to connect the rods 30, 32, 34 to the rods 50, 52, 54. The coupler blocks may include internal threads or concentric rings which match those on the rod ends 56, 58, 60 and 62, 64, 66.

Figure 8:
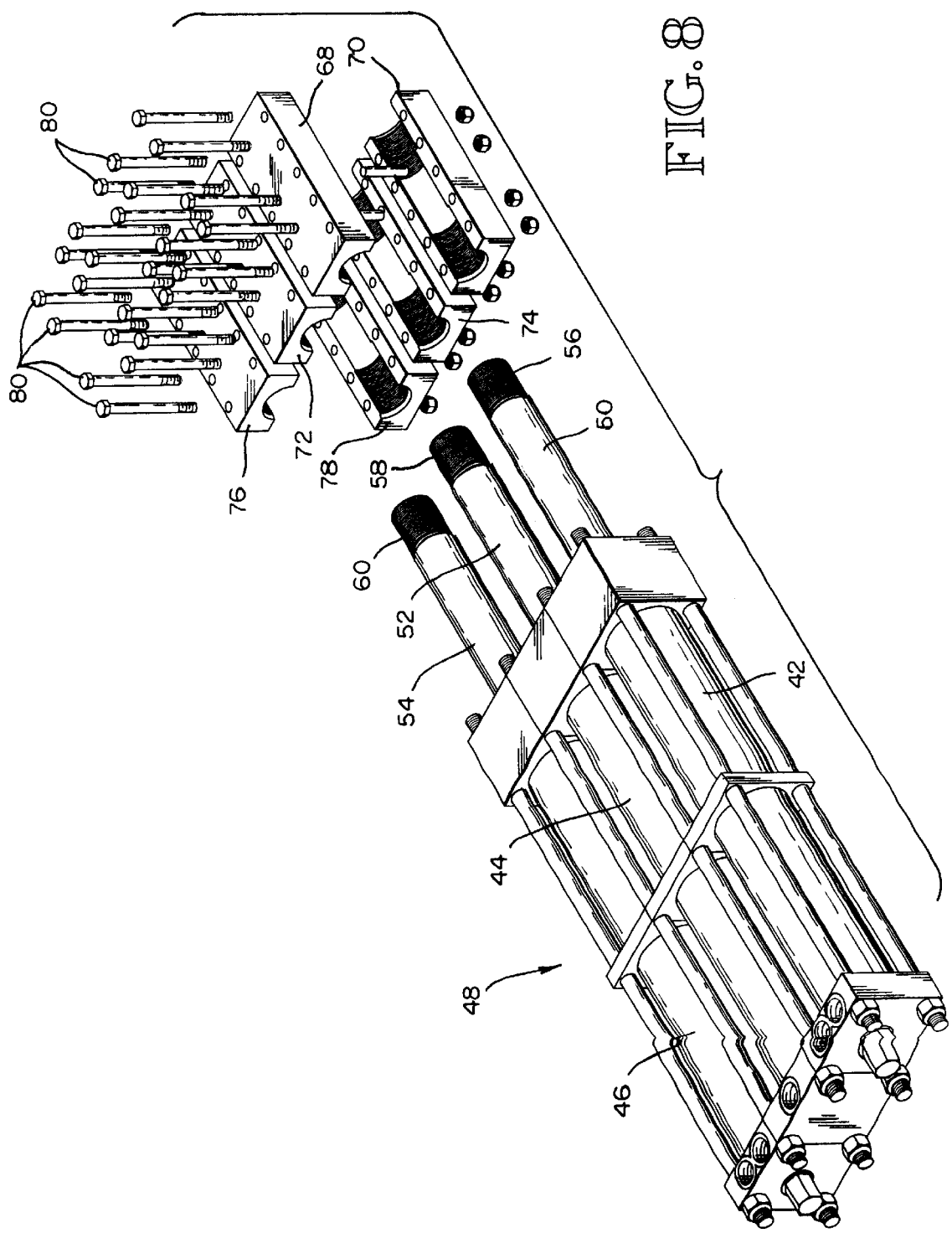
FIG. 8 is a pictorial view of the linear hydraulic drive assembly and coupler structure used for connecting the piston rods to the drive rods.

Referring to FIG. 8, the threaded end portions 56, 58, 60 of the piston rods 50, 52, 54 are shown to be positionable between the threaded end portions of the blocks 68, 70 and 72, 74 and 76, 78. The corresponding end portions 62, 64, 66 of the drive rods 30, 32, 34 are positionable between the threaded opposite end portions of the coupler blocks 68, 70 and 72, 74 and 76, 78. When the rods 50, 52, 54 and 30, 32, 34 are in place, the upper coupler blocks 68, 72, 76 are moved downwardly towards the lower coupler blocks 70, 74, 78. Connector bolts 80 are inserted through openings in the upper blocks 68, 72, 74 and are then threaded into complementary threaded openings in the lower coupler blocks 70, 74, 78. When the bolts are tightened, the end portions 56, 58, 60 and 62, 64, 66 of the piston rods 50, 52, 54 and the drive rods 30, 32, 34 are tightly clamped between the coupler blocks 68, 70 and 72, 74 and 76, 78. The threads or rings May 28, 1999 interengages and act to transmit forces from the piston rods to the coupler blocks to the drive rods. This connects the piston rods 50, 52, 54 to the drive rods 30, 32, 34 such that the drive rods 30, 32, 34 are in effect longitudinal extensions of the piston rods 50, 52, 54. Referring to FIGS. 5 and 6, the piston rod ends of the drive units 42, 44, 46 may be connected to the front wall 16 of the receptacle 10, in any suitable fashion.

Referring to FIGS. 11–14, mounting plates 82, 84, 86 are connected to the drive rods 30, 32, 34, such as by fillet welds 86. (FIGS. 13 and 14). FIGS. 12–14 show mounting plate 84 and drive rod 32. Except for their location on the drive rod, the other mounting plates 82, 86 are connected to their drive rods 30, 32 the same way that drive rod 32 is connected to mounting plate 84. Each mounting plates 82, 84, 86 includes a plurality of bolt receiving openings, some of which are designated 88. As shown by FIGS. 10 and 11, bolts 90 are inserted through the openings 88 and are screwed into tapped openings formed in the transverse drive beams 24, 26, 28.

Figure 9:
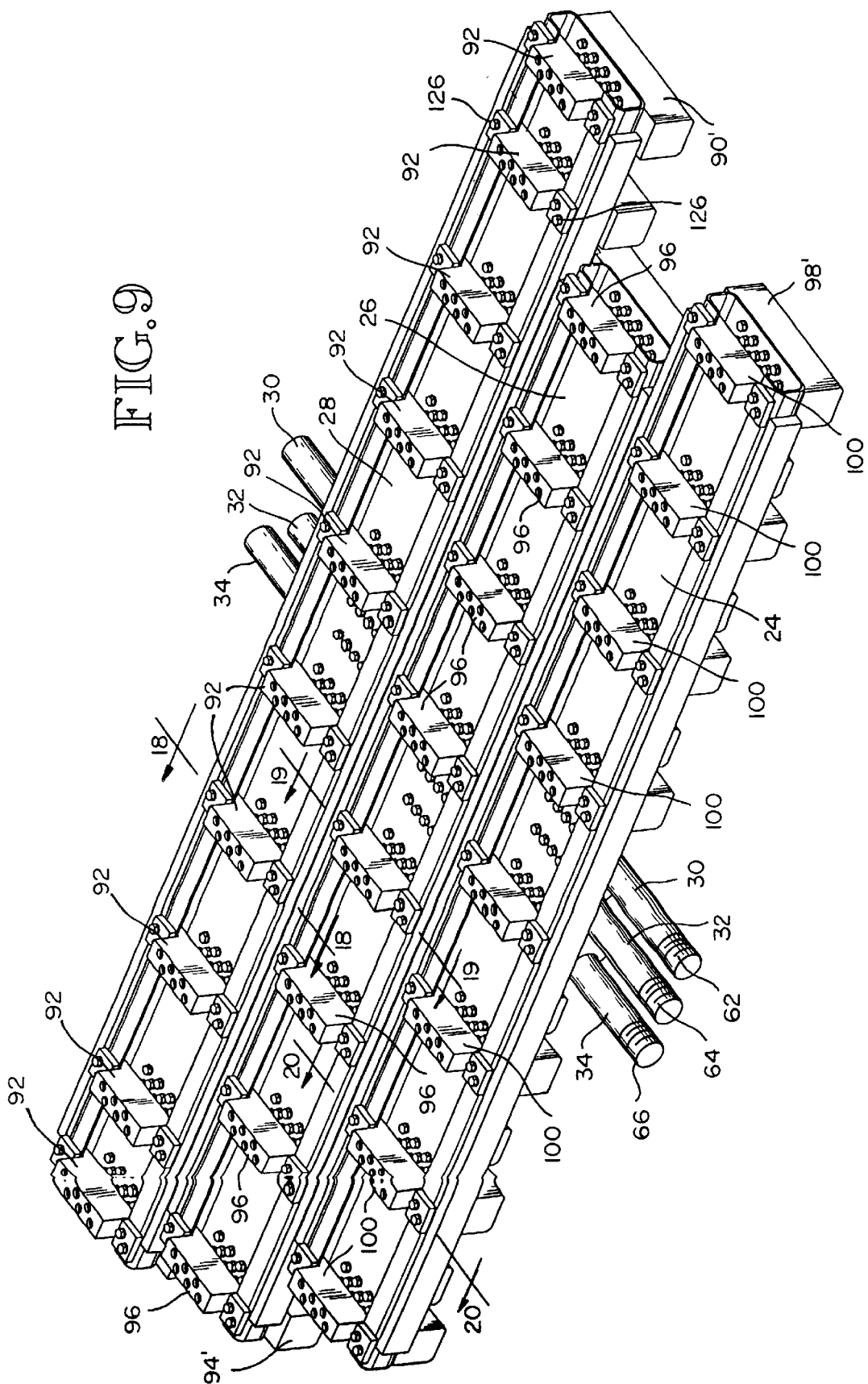
FIG. 9 is a pictorial view of the three transverse drive beams, taken from above and looking towards the front, top and one end of the drive beam assembly.

Each drive beam 24, 26, 28 is provided with downwardly extending connector blocks, one for each slat of its set of lower conveyor slats, and upwardly extending connector blocks, one for each slat of its set of upper conveyor slats. Each upper connector block is positioned vertically above the corresponding lower connector block. FIG. 18 shows one lower connector block 90 and one upper connector block 92 for drive beam 28. FIG. 19 shows one lower connector block 94 and one upper connector block 96 for drive beam 26. FIG. 20 shows one lower connector block 98 and one upper connector block 100 for drive beam 24. As shown by FIGS. 9 and 10, the drive beam 28 is of a length substantially equal to the full width of the conveyor. Because of this, drive beam 28 is provided with ten upper and ten lower conveyor slats 14, 12. Drive beams 24, 26 are each provided with only eight upper slats 14 and eight lower slats 12. This does not have an adverse effect on operation of the conveyor. It is done because it is necessary that the rearward drive beam 28 extends the full width of the conveyor. It and the plank 150 form the transition between the upper and lower conveyor sections. At the ends of the drive beams 24, 26, 30, the lower connectors can be shorter. They are shorter where they do not extend below the next drive beam. In FIG. 9, the connectors 90' are shown to be short and the connector 98' is shown to be short. At the opposite end of the drive beams 26, 28, there is a short connector 94' and a short connector 90' (not shown).

Connector blocks 90, 94, 98 have bottom surfaces that may rest directly on the top 102 of the slats 12. The lower connector blocks 90, 94, 96 are connected to the tops 102 of the lower conveyor slats 12. Bolts 104 extend upwardly through openings in the tops 102 and thread into threaded openings in the blocks 90, 94, 98. The lower connector blocks 90, 94, 98 are connected to the conveyor slats 12 before the conveyor slats are installed on their guide beams and support bearings. In FIG. 18, broken line 106 indicates the level of the top surface of the support beam and also indicates the lower surfaces of the bearings that fit on the support beams and on which the conveyor slats slide. The support beam may extend forwardly to the front of the conveyor. Several bearings are spaced apart along the support beam below the conveyor slats 12 and the lower connector blocks 90.

As shown by FIGS. 16 and 18–20, the transverse drive beams 24, 26, 28 may be in the form of lipped channels. Referring to FIG. 18, drive beam 28 has a bottom wall or web 108, a pair of side flanges 110, 112 that extend upwardly from the web 108, and a pair of inwardly directed lips 114, 116. The lips 114, 116 are in coplanar parallelism. They are spaced apart to define between them an opening or avenue into the interior of the drive beam 28. Bolts 124 extend downwardly through openings in the web 108 and thread into threaded openings in the lower connector blocks 90. Drive beams 24, 26 are of the same construction so they will not be described in detail.

Referring again to FIG. 18, the upper connector blocks 92 have flanges 118, 120 at their ends that include bolt receiving openings. The flanges 118, 120 are positioned below the lips 114, 116. Square washers 120, 122 are positioned on the lips 114, 116. Bolts 126 extend downwardly through openings in washers 120, 122 through openings in lips 114, 116 and thread into threaded openings in the flanges 118, 120. When the bolts 126 are tightened, the connector blocks 92 are firmly connected to the drive beam 28.

The upper conveyor slats 14 are preferably constructed like the lower conveyor slats 12. They have a top, a pair of sidewalls or flanges, and a pair of bottom lips that project inwardly from the lower edges of the flanges. An opening or avenue into the interior of the conveyor slat 14 is formed by and between the lips. The central portions of the connector blocks 92 project upwardly into the upper floor slats 14. Bolts (not shown) extend downwardly through openings 128 (FIG. 7) in the upper conveyor slats 12 and screw into threaded openings 130 in the connector blocks 92. The upper conveyor slats 14 extend forwardly and rearwardly from the location of the connection, in cantilever fashion.

As shown by FIG. 18, connector block 90 may be provided with a sheet 132 of bearing material on which the web portion of the adjacent drive beam 26 rests when it is in a position over the connector block 90. FIG. 19 shows the connector block 94 with two sheets 134, 136 of a bearing material. Sheet 134 is sometimes below transverse drive beam 24. Sheet 136 is sometimes below transverse drive beam 28. FIG. 20 shows a sheet of bearing material 138 on connector block 98. It is at times below drive beam 26. As can be seen from FIGS. 18–20, when the three drive beams 24, 26, 28 are moved together, to advance a load in the compartment 10, the transverse drive beam 24 is over bearing material 134. The transverse drive beam 26 is over the bearing material 138 and the transverse drive beam 28 is over the bearing material 136. When the conveyor slats 12, 14 are fully extended (FIG. 1), and the drive unit for drive beam 28 is operated to retract drive beam 28, the drive beam 28 will slide rearwardly on the bearing material 136 during at least most of its travel. When the drive unit for drive beam 26 is operated to retract drive beam 26, the bearing material 136 will move under the transverse drive beam 28 and the bearing material 134 will move out from under the transverse drive beam 24. When the drive unit for the transverse drive beam 24 is operated to retract drive beam 24, the bearing material 138 will move under drive beam 26.

As shown by FIGS. 19 and 20, the connector blocks 96, 100 are connected to the drive beams 26, 24 in the same way that the connector block 92 is connected to the drive beam 28. Drive beams 24, 26 are also secured to their lower connector blocks 94, 98 by bolts 124. The bolts 124 for all three drive beams 24, 26, 28 are installed before the connector blocks 92, 96, 100 are installed.

Figure 7:
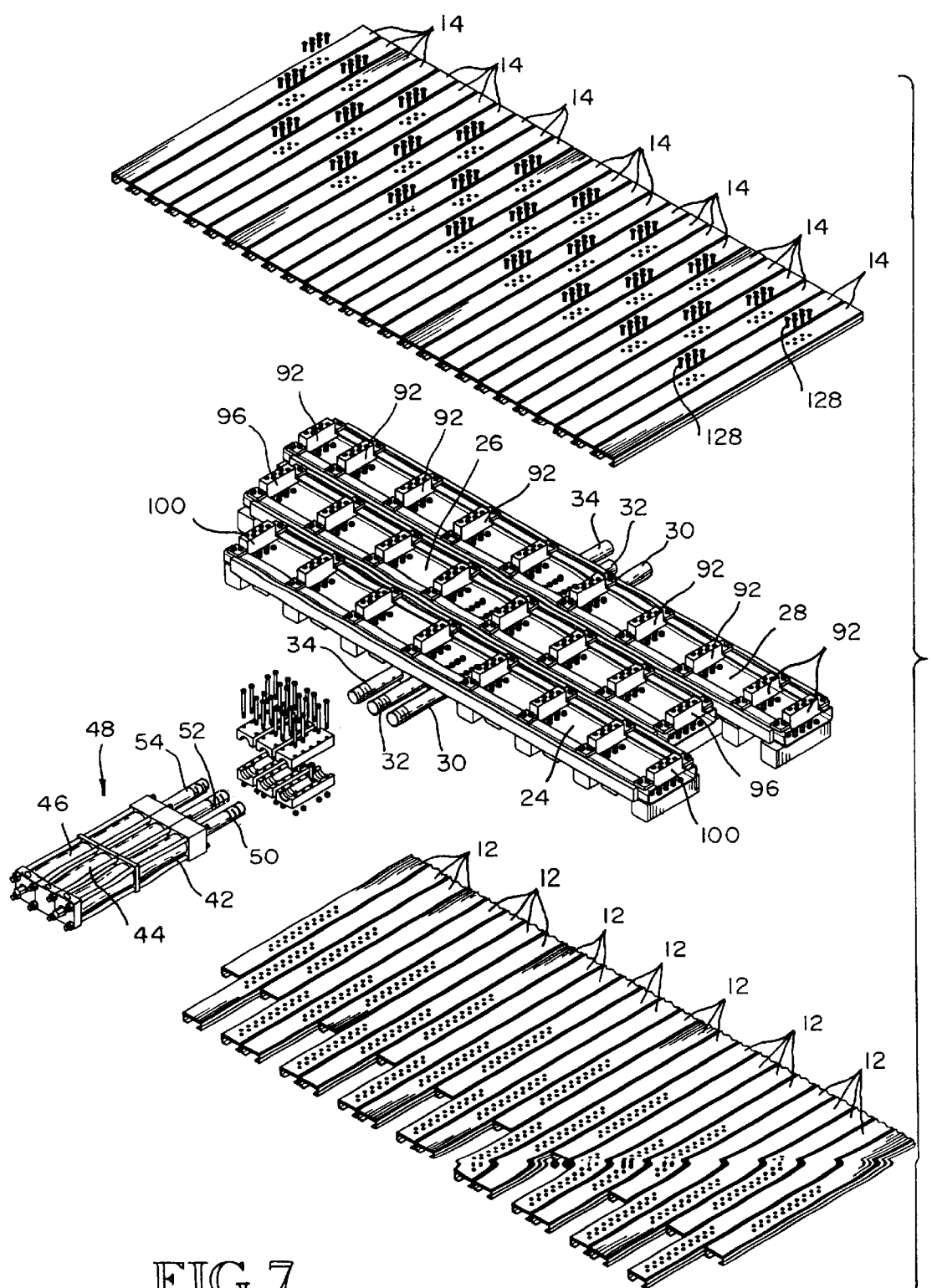
FIG. 7 is a fragmentary, exploded pictorial view of the drive assembly, the upper conveyor slats and front end portions of the lower conveyor slats.

Referring to FIGS. 6–7, the drive units 42, 44, 46 are two way linear hydraulic motors. Preferably, they are tandem units. That is, they each have a piston rod inside of a cylinder barrel and there are two piston heads on the piston rod. A divider wall is provided at the longitudinal center of the cylinder barrel. Thus, there are four working chambers, one on each side of each piston head. The working chambers on common sides of the piston heads are connected together. An embodiment of this connection is disclosed in my U.S. Pat. No. 5,638,943, granted Jun. 17, 1997 and entitled, "Drive Assembly For Reciprocating Slat Conveyor." See FIG. 16 in that patent. The drive control system can be basically like the drive control system disclosed in my U.S. Pat. No. 5,125, 502, granted Jun. 30, 1992, and entitled, "Drive Mechanism For A Reciprocating Floor Conveyor." See in particular FIG. 8 in that patent.

Referring to FIG. 15, a plank 150 of plastic material is positioned rearwardly of transverse drive beam 30 and is secured to transverse drive beam 30. Sheets 152 of a plastic bearing material are secured to the top of the drive beam 30, between the connector blocks 92. The rearward end portions of the conveyor slats 14 from the "1" and "3" sets slide back and forth across the bearing material 152. The slats 14 from set "3" are connected to the drive beam 30 and move with it.

Following extension of the upper conveyor slats 14 to fully extended positions, the rear ends of all three sets "1", "2", "3" of upper conveyor slats 14 will be substantially flush with the rear face of plank 150. Whatever the load, it is supported on both the upper and lower conveyor slats 14, 12. Following retraction of all three floor slat sets "1", "2", "3", a space will be created immediately rearwardly of plank 50. However, the material in the compartment 10 will immediately move into this space.

The upper conveyor slats 14 have a link that is little greater than the combined widths of the three drive beams 24, 26, 28 and the stroke length of the drive units. The height of plank 150 is determined primarily by the vertical height of the drive beams 24, 26, 30 and the vertical height of the connector blocks 90, 92, 94. This can be seen from FIGS. 18–20. In a typical installation, the vertical distance between the tops of lower slats 12 and the tops of upper slats 14 is about six inches. Accordingly, the amount of storage volume lost in receptacle 10 by virtue of the placement of the drive beams 24, 26, 28 and the elements below them is substantially equal to about six inches times the width of the conveyor times the length of the upper conveyor slats 14. The use of sloping wall 40 further reduces the front end capacity of the receptacle 10. However, the amount of capacity lost with this system is considerably less than the capacity lost when a bulk head is used and the drive beams are housed forwardly and below the bulk head, such as disclosed in the aforementioned U.S. Pat. Nos. 5,096,356 and 5,332,081.

As best shown by FIG. 6, the drive rods 30, 32, 34 are housed below the transverse drive beams 24, 26, 28. They extend longitudinally of the conveyor in spaces between adjacent connector blocks 90, 94, 98.

The illustrated embodiments are only examples of the present invention and, therefore, are non-limitive. It is to be understood that many changes in the particular structure, materials and features of the invention may be made without departing from the spirit and scope of the invention. Therefore, it is my intention that my patent rights not be limited by the particular embodiments illustrated and described herein, but rather determined by the following claims, interpreted according to accepted doctrines of claim interpretation, including use of the doctrine of equivalents and reversal of parts.

What is claimed is:

1. A reciprocating slat conveyor having a first end and a second end, said conveyor comprising:

a plurality of longitudinally extending, lower conveyor slats, positioned side-by-side across the conveyor and divided into a plurality of slat sets;

a plurality of transverse drive beams at the first end of the conveyor, one for each set of lower conveyor slats, said transverse drive beams extending over and perpendicular to the lower conveyor slats, and each said transverse drive beam being connected to its set of lower conveyor slats; and upper conveyor slats corresponding in number to the lower conveyor slats, said upper conveyor slats extending parallel to the lower conveyor slats above the transverse drive beams, said upper conveyor slats being divided into sets corresponding to the sets of the lower conveyor slats, and each upper set of conveyor slats being connected to the transverse drive beam for the corresponding lower set of conveyor slats, whereby the upper and lower conveyor slat sets will move together.

2. The conveyor of claim 1, wherein each transverse drive beam includes a plurality of downwardly extending connector blocks, one for each lower conveyor slat of its slat set, each said connector block being connected to its lower conveyor slat.

3. The conveyor of claim 1, wherein each lower conveyor slat comprises a top wall, opposite sidewalls, and bottom flanges, together defining an inner space in the lower conveyor slat, and wherein said conveyor further comprises a plurality of longitudinal support beams, one for each lower conveyor slat, each said support beam being situated in the inner space of its conveyor slat, and slat bearings on said support beams below the top walls of the conveyor slats, said top walls resting on said slat bearings, and said lower conveyor slats being supported by said slat bearings for reciprocating movement lengthwise of the conveyor.

4. The conveyor of claim 3, wherein each transverse drive beam includes a plurality of downwardly extending connector blocks, one for each lower conveyor slat of its slat set, each said connector block resting on and being connected to the top wall of its lower conveyor slat.

5. The conveyor of claim 2, wherein each transverse drive beam also includes a plurality of upwardly directed connector blocks, one for each upper conveyor slat of its slat set, and wherein each upper conveyor slat is connected to its upper connector block.

6. The conveyor of claim 5, wherein each upper conveyor slat comprises a top wall, opposite sidewalls, and bottom flanges, together defining an inner space in the upper conveyor slat, and wherein each upwardly directed connector extends into the inner space of its upper conveyor slat and is connected to the top of its upper conveyor slat.

7. The conveyor of claim 1, wherein each said transverse drive beam is a lipped channel comprising a bottom web, a pair of opposite side flanges extending upwardly from said bottom web, and a pair of top lips projecting inwardly from said flanges, said transverse drive beam including an inner space and a top avenue into the inner space defined by and between the top lips.

8. The conveyor of claim 7, wherein each transverse drive beam includes a plurality of downwardly extending connector blocks, one for each lower conveyor slat of its slat set, each said connector block having a top connected to the web of its transverse drive beam and a bottom resting on and being connected to its lower conveyor slat.

9. The conveyor of claim 7, wherein each lower conveyor slat comprises a top wall, opposite sidewalls, and bottom flanges, together defining an inner space in the lower conveyor slat, and wherein said conveyor further comprises a plurality of longitudinal support beams, one for each lower conveyor slat, each said support beam being situated in the inner space of its conveyor slat, and slat bearings on said support beams below the top walls of the conveyor slats, said top walls resting on said slat bearings, and said lower conveyor slats being supported by said slat bearings for reciprocating movement lengthwise of the conveyor.

10. The conveyor of claim 9, wherein each transverse drive beam includes a plurality of downwardly extending connector blocks, one for each lower conveyor slat of its slat set, each said connector block resting on and being connected to the top wall of its lower conveyor slat.

11. The conveyor of claim 7, wherein each transverse drive beam also includes a plurality of upwardly directed connector blocks, one for each upper conveyor slat of its slat set, and wherein each upper conveyor slat is connected to its connector block.

12. The conveyor of claim 11, wherein each upper conveyor slat comprises a top wall, opposite sidewalls, and bottom flanges, together defining an inner space in the upper conveyor slat, and wherein each upwardly directed connector extends into the inner space of its upper conveyor slat and is connected to the top wall of its upper conveyor slat.

13. The conveyor of claim 11, wherein the upwardly directed connector blocks are connected to the lips of the transverse drive beam.

14. The conveyor of claim 13, wherein each upper conveyor slat comprises a top wall, opposite sidewalls, and bottom flanges, together defining an inner space in the upper conveyor slat, and wherein each upwardly directed connector extends into the inner space of its upper conveyor slat and is connected to the top wall of its upper conveyor slat.

15. The conveyor of claim 1, wherein said transverse drive beams comprise a forward transverse drive beam positioned the closest to the first end of the conveyor, a rearward transverse drive beam positioned the furthest from the first end of the conveyor, and at least one intermediate transverse drive beam positioned between the forward and rearward transverse drive beams, wherein the rearward transverse drive beam includes a rearward face that extends upwardly from the lower conveyor slats to the upper conveyor slats.

16. The conveyor of claim 15, wherein the set of upper conveyor slats that are connected to the rearward transverse drive beam extend forwardly from the rearward transverse drive beam over the intermediate and forward transverse drive beams.

17. The conveyor of claim 1, further comprising a plurality of drive rods, one for each transverse drive beam, said drive rods extending longitudinally of the conveyor below the transverse drive beams and above the lower conveyor slats, each drive rod being secured to its transverse drive beam and extending forwardly from its transverse drive in parallelism with the other drive rods, each to a forward end.

18. The conveyor of claim 17, wherein each transverse drive beam includes a plurality of downwardly extending connector blocks, one for each lower conveyor slat of its conveyor set, each said connector block being connected to its lower conveyor slat, and wherein each drive rod is positioned between an adjacent pair of connector blocks.

19. The conveyor of claim 18, wherein each drive rod includes a mounting plate to which the drive rod is connected, wherein each transverse drive beam in a lipped channel comprising a bottom web, a pair of opposite side flanges extending upwardly from said bottom web, and a pair of top lips projecting inwardly from said flanges, each transverse drive beam including an inner space and a top avenue into the inner space defined by and between the top lips, and wherein screw fasteners are used to secure each mounting plate to the bottom web of its transverse drive beam.

20. The conveyor of claim 19, wherein each transverse drive beam also includes a plurality of upwardly directed connector blocks, one for each upper conveyor slat of its slat set, and wherein each upper conveyor slat is connected to its connector block and the connector block is connected to the lips of its transverse drive beam.

21. A receptacle comprising:
a front wall, a bottom, and opposite sidewalls defining an elongated material receiving compartment;
a plurality of longitudinally extending, lower conveyor slats, positioned side-by-side across the bottom of said material receiving compartment, being supported for longitudinal back and forth movement, and being divided into a plurality of slat sets;
a plurality of transverse drive beams at said first end, one for each set of lower conveyor slats, said transverse drive beams extending over and perpendicular to the lower conveyor slats, and each said transverse drive beam being connected to its set of conveyor slats; and
upper conveyor slats equal in number to the number of lower conveyor slats, said upper conveyor slats extending parallel to the lower conveyor slats above the transverse drive beams, said upper conveyor slats being divided into sets corresponding to the sets of the lower conveyor slats, and each upper set of conveyor slats being connected to the transverse drive beam connected to the corresponding lower set of conveyor slats, whereby the upper and lower conveyor sets will move together.

22. The receptacle of claim 21, wherein each transverse drive beam includes a plurality of downwardly extending connector blocks, one for each lower conveyor slat of its slat set, each said connector block being connected to its lower conveyor slat.

23. The receptacle of claim 21, wherein each lower conveyor slat comprises a top wall, opposite sidewalls, and bottom flanges, together defining an inner space in the lower conveyor slat, and wherein said receptacle further comprises a plurality of longitudinal support beams, one for each lower conveyor slat, each said support beam being situated in the inner space of its conveyor slat, and slat bearings on said support beams below the top walls of the conveyor slats, said top walls resting on said slat bearings, and said lower conveyor slats being supported by said slat bearings for reciprocating movement lengthwise of the conveyor.

24. The receptacle of claim 23, wherein each transverse drive beam includes a plurality of downwardly extending connector blocks, one for each lower conveyor slat of its slat set, each said connector block resting on and being connected to the top wall of its lower conveyor slat.

25. The receptacle of claim 22, wherein each transverse drive beam also includes a plurality of upwardly directed connector blocks, one for each upper conveyor slat of its slat set, and wherein each upper conveyor slat is connected to its upper connector block.

26. The receptacle of claim 25, wherein each upper conveyor slat comprises a top wall, opposite sidewalls, and bottom flanges, together defining an inner space in the upper conveyor slat, and wherein each upwardly directed connector extends into the inner space of its upper conveyor slat and is connected to the top of its upper conveyor slat.

27. The receptacle of claim 21, wherein each said transverse drive beam is a lipped channel comprising a bottom web, a pair of opposite side flanges extending upwardly from said bottom web, and a pair of top lips projecting inwardly from said flanges, said transverse drive beam including an inner space and a top avenue into the inner space defined by and between the top lips.

28. The receptacle of claim 27, wherein each transverse drive beam includes a plurality of downwardly extending connector blocks, one for each lower conveyor slat of its slat set, each said connector block having a top connected to the web of its transverse drive beam and a bottom resting on and being connected to its lower conveyor slat.

29. The receptacle of claim 27, wherein each lower conveyor slat comprises a top wall, opposite sidewalls, and bottom flanges, together defining an inner space in the lower conveyor slat, and wherein said receptacle further comprises a plurality of longitudinal support beams, one for each lower conveyor slat, each said support beam being situated in the inner space of its conveyor slat, and slat bearings on said support beams below the top walls of the conveyor slats, said top walls resting on said slat bearings, and said lower conveyor slats being supported by said slat bearings for reciprocating movement lengthwise of the conveyor.

30. The receptacle of claim 29, wherein each transverse drive beam includes a plurality of downwardly extending connector blocks, one for each lower conveyor slat of its slat set, each said connector block resting on and being connected to the top wall of its lower conveyor slat.

31. The receptacle of claim 27, wherein each transverse drive beam also includes a plurality of upwardly directed connector blocks, one for each upper conveyor slat of its slat set, and wherein each upper conveyor slat is connected to its connector block.

32. The receptacle of claim 31, wherein each upper conveyor slat comprises a top wall, opposite sidewalls, and bottom flanges, together defining an inner space in the upper conveyor slat, and wherein each upwardly directed connector extends into the inner space of its upper conveyor slat and is connected to the top wall of its upper conveyor slat.

33. The receptacle of claim 31, wherein the upwardly directed connector blocks are connected to the lips of the transverse drive beam.

34. The receptacle of claim 33, wherein each upper conveyor slat comprises a top wall, opposite sidewalls, and bottom flanges, together defining an inner space in the upper conveyor slat, and wherein each upwardly directed connector extends into the inner space of its upper conveyor slat and is connected to the top wall of its upper conveyor slat.

35. The receptacle of claim 21, wherein said transverse drive beams comprise a forward transverse drive beam positioned the closest to the first end of the conveyor, a rearward transverse drive beam positioned the furthest from the first end of the conveyor, and at least one intermediate transverse drive beam positioned between the forward and rearward transverse drive beams, wherein the rearward transverse drive beam includes a rearward face that extends upwardly from the lower conveyor slats to the upper conveyor slats.

36. The receptacle of claim 35, wherein the set of upper conveyor slats that are connected to the rearward transverse drive beam extend forwardly from the rearward transverse drive beam over the intermediate and forward transverse drive beams.

37. The receptacle of claim 21, further comprising a plurality of drive rods, one for each transverse drive beam, said drive rods extending longitudinally of the material receiving compartment below the transverse drive beams and above the lower conveyor slats, each drive rod being secured to its transverse drive beam and extending forwardly from its transverse drive in parallelism with the other drive rods, each to a forward end.

38. The receptacle of claim 37, wherein each transverse drive beam includes a plurality of downwardly extending connector blocks, one for each lower conveyor slat of its conveyor set, each said connector block being connected to its lower conveyor slat, and wherein each drive rod is positioned between an adjacent pair of connector blocks.

39. The receptacle of claim 38, wherein each drive rod includes a mounting plate to which the drive rod is connected, wherein each transverse drive beam in a lipped channel comprising a bottom web, a pair of opposite side flanges extending upwardly from said bottom web, and a pair of top lips projecting inwardly from said flanges, each transverse drive beam including an inner space and a top avenue into the inner space defined by and between the top lips, and wherein screw fasteners are used to secure each mounting plate to the bottom web of its transverse drive beam.

40. The receptacle of claim 39, wherein each transverse drive beam also includes a plurality of upwardly directed connector blocks, one for each upper conveyor slat of its slat set, and wherein each upper conveyor slat is connected to its connector block and the connector block is connected to the lips of its transverse drive beam.

\* \* \* \* \*